United States Patent
Stählin et al.

(10) Patent No.: US 10,567,934 B1
(45) Date of Patent: Feb. 18, 2020

(54) DEVICE FOR VEHICLE-TO-X COMMUNICATION AND METHOD

(71) Applicant: Continental Teves AG & Co. oHG, Frankfurt (DE)

(72) Inventors: Ulrich Stählin, Rochester, MI (US); Marc Menzel, Weimar (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 16/190,382

(22) Filed: Nov. 14, 2018

(51) Int. Cl.
  *H04W 4/02* (2018.01)
  *H04W 4/40* (2018.01)
  *H04B 1/3822* (2015.01)

(52) U.S. Cl.
  CPC ............ *H04W 4/40* (2018.02); *H04B 1/3822* (2013.01)

(58) Field of Classification Search
  CPC ...... H04B 1/38; H04B 1/3822; H04B 1/3827; H04W 4/02; H04W 4/029; H04W 4/40; H04W 4/44
  See application file for complete search history.

(56) References Cited

U.S. PATENT DOCUMENTS

| | | | |
|---|---|---|---|
| 2016/0119419 A1* | 4/2016 | Choi | H04W 4/40 701/36 |
| 2018/0050673 A1* | 2/2018 | D'sa | B60W 30/0953 |
| 2018/0114441 A1* | 4/2018 | Marmet | H04W 4/44 |
| 2019/0132723 A1* | 5/2019 | Sorrentino | H04W 72/10 |

* cited by examiner

*Primary Examiner* — Thanh C Le
(74) *Attorney, Agent, or Firm* — RatnerPrestia

(57) ABSTRACT

A device for vehicle-to-X communication including: a computing unit for processing information received via vehicle-to-X communication, wherein the device is designed to generate signals for simulating information received via vehicle-to-X communication and to supply the signals to an input path of the device for processing by the computing unit. Furthermore, the invention relates to a corresponding method and to the use of the device in a vehicle.

16 Claims, 2 Drawing Sheets

DEVICE FOR VEHICLE-TO-X COMMUNICATION AND METHOD

FIELD OF THE INVENTION

The present invention relates to a device for vehicle-to-X communication, to a corresponding method, and to the use of the device.

BACKGROUND OF THE INVENTION

Vehicle-to-X communication is currently moving towards series production. It in particular provides vehicles with the possibility of emitting vehicle-to-X messages, at given distances or in the event of certain incidents, which for example include information about speed, position, route, acceleration or particular incidents such as breakdowns or emergency braking maneuvers. The currently applicable standards are IEEE802.11(p), IEEE1609, SAE 2735, SAE 2945 and ETSI ITS-G5. New 3GPP standards for Cellular-V2X (C-V2X) are also currently being drawn up.

Vehicle-to-X communication is a cooperative technology. This means that it is usually necessary for at least two communication devices suitable for vehicle-to-X communication to participate if the cooperative system is to take effect. This is true not only of the intended field of use, but also for the test phase during development. Under laboratory conditions this is comparatively simple to achieve, since during development communication devices can be operated with a simulator. Driving trials and real traffic simulations are not problem-free, however, since in these cases the communication device under development is itself moving and thus at least the position can be comparatively difficult to predetermine. Due to the large number of vehicles which need to be coordinated, unsuccessful tests occur to an increased degree and particularly critical driving maneuvers may not be tested so as not to put the participants at risk.

SUMMARY OF THE INVENTION

An aspect of the invention is a device and a method by means of which the above-stated disadvantages can be overcome.

An aspect of the invention describes a device for vehicle-to-X communication comprising a computing unit for processing information received via vehicle-to-X communication, signals being generatable by means of the device to simulate information received by vehicle-to-X communication and the signals being suppliable to an input path of the device for processing by the computing unit. In other words, the device is designed to generate signals to simulate information received by vehicle-to-X communication and to process the signals using the computing unit.

The underlying concept of an aspect of the invention is that of simulating incoming vehicle-to-X information from other road users or infrastructure units by means of signals produced by the device itself. The input path of the device used for supply is conveniently the input path which is used to transmit information received using vehicle-to-X communication. The signals provided for simulation are thus produced by the device itself and also reprocessed by the device itself using the information received by vehicle-to-X communication. One advantage achieved in this way is that unsuccessful tests in real traffic simulations which may result from coordinating the movements of a plurality of communication participants, i.e. driving trials, may be avoided. Furthermore, traffic situations or driving maneuvers which are not performed due to the danger they present to participants may be simulated. It is moreover possible to reduce the number of road users, in particular vehicles, needed for real traffic simulations or to avoid the use thereof completely. In this way, a correspondingly large number of vehicles no longer needs to be used for real simulation and correspondingly critical situations can be taken into account or tested merely by laboratory simulation. In the case of predetermined use of a unit comprising the device, for example use of a vehicle comprising the device by a private owner in road traffic, the device may advantageously perform self-verification.

Signals are conveniently generated and processed by means of the computing unit. Alternatively or in addition, however, generation and processing may be performed by a plurality of computing units.

Examples of advantageous use are the testing of "Congestion Control" with a reduced number of vehicles, wherein all the other vehicles are simulatable by the signals, and tests for intersection assistance for critical traffic situations, wherein an error in the assistance function would lead to a collision, the vehicle causing the dangerous situation being simulatable by signal.

A vehicle may be a motor vehicle, in particular a passenger vehicle, a truck, a motorcycle, an electric vehicle or a hybrid vehicle, a watercraft or an aircraft.

According to one embodiment, the device is designed to transmit information resulting from processing of the signals at least in part to at least one other device for processing, in particular a device of another vehicle system.

According to a further development of the device, at least one road user and/or one infrastructure unit and/or one central server is simulatable by means of the signals. Conventionally, conclusions may be drawn on the basis of information received vehicle-to-X communication inter alia as to the nature of a sender of this received information or vehicle-to-X message. In this respect, it may thus be understood that road users and/or an infrastructure unit and/or a central server are simulatable using the generated information. This advantageously makes it possible to represent a comparatively simple traffic situation up to comparatively complex traffic situations.

According to one embodiment, the device is designed to simulate information received by vehicle-to-X communication from a road user and/or an infrastructure unit and/or a central server by means of the signals. In other words, the device is designed to produce signals which enable simulation of at least one road user and/or one infrastructure unit and/or one central server. Road users should in this case be taken to mean, for example, vehicles or people which/who have units for vehicle-to-X communication or carry such with them.

At least one processing stage of received vehicle-to-X messages is conveniently simulatable by means of the signals. Provision may for example be made for at least one processing stage of a vehicle-to-X message corresponding to a vehicle-to-X communication protocol stack to be simulated by means of the signals. This relates substantially to unprocessed vehicle-to-X messages, as are conventionally present directly at an input of a protocol stack after receipt of the message by means of an antenna, and all the message processing stages of the individual layers of the protocol stack up to the information comprised by the message, extracted and optionally already separated, which is relevant with regard to the transmitter in particular for detecting the traffic situation.

According to a further development, the device is designed to simulate, by means of the signals, information transmitted from a road user and/or an infrastructure unit and/or a central server relating to a speed, position, route, acceleration and/or incident, in particular breakdowns or warnings. Vehicle-to-X communication standards used, such as for example IEEE802.11(p), IEEE1609, SAE 2735, SAE 2945, ETSI ITS-G5 and/or standards for Cellular-V2X, may conveniently be replicated by means of the signals.

According to one embodiment, the device is designed such that the signals are functionally suppliable to the input path between an antenna of the device and the computing unit. If in particular the communication protocol stack is produced or embodied by means of a further computing unit, the information included by otherwise conventionally incoming vehicle-to-X messages are suppliable directly to the input path for processing by the computing unit. The further computing unit may for example be comprised by the antenna (for example smart antenna), a compensator and/or by an electronic control unit, comprising the further computing unit, for vehicle-to-X communication (ECU), wherein the computing unit and the further computing unit may also take the form of a common computing unit, for example an integrated circuit. The electronic control unit may accordingly likewise be conveniently comprised by the device for vehicle-to-X communication.

According to a further development, the device is designed to provide the signals as radio frequency signals (RF signals). If the electronic control unit, which comprises at least the computing unit, is for example designed to receive and process radio frequency signals from the antenna or a compensator, the signals may advantageously thus be injected into the part of the radio frequency input path comprising by the electronic control means. Alternatively or in addition, the generated signals can also be designed to be of another, for example digitized, type and to be supplied to a part of the input path suitable for processing this type for processing of incoming vehicle-to-X messages.

According to a further development, at least parts of an output path otherwise provided for the generation, processing and internal transmission of vehicle-to-X messages to be emitted by means of an antenna or information comprised thereby may be used for the generated signals. Thus, only information actually to be emitted or vehicle-to-X messages to be emitted and having content to be simulated need be produced and supplied to the computing unit for processing. As a result, little additional effort is involved.

According to one embodiment, the device is designed to effect a comparison of results expected on the basis of the generated signals with results actually detected through processing by the device. Self-verification internal to the device thus takes place. If in this case the results of processing the simulated traffic situation are output by the device to at least one further system of the underlying unit, the response of this system is likewise verifiable. This allows verification of all the systems of the underlying unit which are participating as a function of the simulated traffic situation.

According to a further development, the device is designed to form the simulated information as a function of the intrinsic motion of the device. Advantageously, a simulated traffic situation is thus obtained, taking account of the intrinsic motion of the device or of a unit comprising the device. The simulated road users are thus in particular simulatable with regard to their position and/or motion in such a way that the traffic situation arises precisely as intended for testing, for example a driving trial.

According to one embodiment, the simulated information may be formed as a function of a location-related and/or time-related setpoint. For example, a location-related and/or time-related offset until the start of a simulation or respective traffic situations is thus achievable. For example, a movement path or a trajectory of at least one further road user may be predeterminably configured and, when the device or a unit comprising the device, e.g. a vehicle, passes through a predeterminable trigger position, the device may be designed to start simulation of a correspondingly predetermined simulated road user or plurality of road users. This is achievable by means of a trigger time or time interval. For example, the start of simulation of a road user to be simulated may be provided after 10 s of driving time of a vehicle comprising the device. Identification of the trigger position in this case conveniently proceeds by means of a global satellite navigation system, such that the trigger position is also predeterminable in corresponding coordinates.

According to one embodiment, the device is designed to form the simulated information as a function of information actually received via vehicle-to-X communication. Accordingly, the actually received vehicle-to-X messages are at least not simulated by the device itself. Emitters of these vehicle-to-X messages may be at least one real road user, infrastructure unit and/or central server. These do not necessarily also have to emit message contents relating thereto. For example, simulation of a traffic situation is achievable at least in part by means of a central server which simulates the vehicle-to-X messages at least from a road user, infrastructure unit and/or central server.

According to one further embodiment, the device is designed to modify information received via vehicle-to-X communication by a predeterminable location-related and/or time-related offset. In other words, the device is designed to use the information received via vehicle-to-X communication at a time-offset point in time or a location-offset position for the simulation of traffic situations. Alternatively or in addition, the location-related and/or time-related offset of the provision, i.e. emission and corresponding receipt, of the vehicle-to-X messages may be achieved in particular in the context of a further development of the method according to an aspect of the invention. Of particular relevance to safety in the case of real road users, movement operations of an emitting road user may thus advantageously be performed by the receiving device in location- and/or time-independent manner. The recording of information and provision to the device are thus decoupled from location and time, so significantly increasing flexibility. In the case of a time-related offset, data storage takes place after the movement operation and prior to emission to bring about the time-related offset.

An aspect of invention further describes a method comprising the steps:
production, by means of a device for vehicle-to-X communication, of signals for simulating information received via vehicle-to-X communication,
supply of the signals to a computing unit of the device and processing of the signals by the computing unit.

Application of the method likewise results in the advantages already explained above of at least one embodiment of the device according to an aspect of the invention.

According to one embodiment, the device transmits, in particular by means of a data bus, information resulting from processing of the signals at least in part to at least one other device for processing, in particular another vehicle system, for example a driver assistance system. Further embodiments of the method result from the variant embodiments of the described device.

According to a further aspect of the invention, the device is set up to carry out a method according to at least one of the above embodiments.

In a further development of the stated device, the stated device has a memory and a processor. In this way, the stated method is saved in the memory in the form of a computer program and the processor is provided to carry out the method when the computer program is loaded from the memory into the processor.

According to a further aspect of the invention, a computer program comprises program code means for carrying out all the steps of one of the stated methods when the computer program is run on a computer or one of the stated devices.

According to a further aspect of the invention, a computer program product contains a program code which is stored on a computer-readable data storage medium and which, when run on a data processing unit, carries out one of the stated methods.

BRIEF DESCRIPTION OF THE DRAWINGS

Several particularly advantageous configurations of aspects of the invention are indicated in the subclaims. Further preferred embodiments are also apparent from the following description of exemplary embodiments made with reference to the figure, in which:

DETAILED DESCRIPTION OF THE PREFERRED EMBODIMENTS

Figure 1:
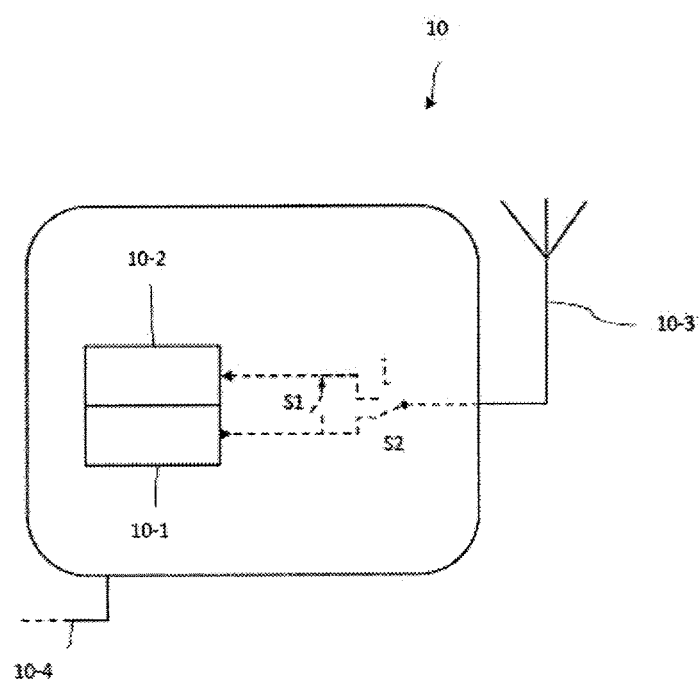
FIG. 1 shows an exemplary embodiment of the device according to the invention with the assistance of a block diagram and FIG. 2 shows an exemplary embodiment of the method according to the invention with the assistance of a flow diagram.

FIG. 1 shows an exemplary embodiment of the device 10 for vehicle-to-X communication according to an aspect of the invention with the assistance of a block diagram. The device 10 is designed to generate signals for simulating information received via vehicle-to-X communication using a computing unit 10-1 and to process the signals with the assistance of a computing unit 10-2. In principle, the device 10 is designed to process information received via antenna 10-3 by vehicle-to-X communication by means of computing unit 10-2. The block diagram of FIG. 1 likewise shows in a simplified manner an output path for transmitting information to be emitted by means of antenna 10-3 from computing unit 10-1 to antenna 10-3 and an input path for transmitting information received by means of antenna 10-3 from antenna 10-3 to computing unit 10-2 for processing received vehicle-to-X messages. Input and output path are illustrated by corresponding direction arrows. A changeover between input path and output path may be performed by means of switching unit S2, wherein in the case of emission being desired the output path is connectable to the antenna and in the case of receipt being intended the input path is connectable. To transmit signals generated by means of computing unit 10-1 for simulating information received by vehicle-to-X communication and processing by means of computing unit 10-2, device 10 additionally comprises a signal transmission path between the output path and the input path, which comprises a switching unit S1. If, in the closed state, the switching unit S1 enables signal transmission, information generated by the computing unit 10-1 is supplied to the computing unit 10-2 via the input path. To prevent the generated information in this case from being emitted by means of antenna 10-3, a third switching state may be provided for the switching unit S2 by which signal transmission between the computing units 10-1 and 10-2 and to/from antenna 10-3 may conveniently be prevented. In FIG. 1 this third switching state is represented by an unconnected switching state contact. Alternatively, however, provision may also be made to enable information transfer and corresponding emission by means of antenna 10-3 in parallel, so as to be able to monitor the generated information for example externally. The simulated information processed by computing unit 10-4 is suppliable by means of data bus 10-4 to other apparatuses or systems not shown in FIG. 1, in particular vehicle systems.

Alternatively or in addition, according to an embodiment which is not shown, a directional coupler may in particular be provided between S1 and S2 to prevent emission by means of computing unit 10-1 via antenna 10-3. In this case, it is possible to dispense with a third switching state of switching unit S2.

Also alternatively or in addition, according to an embodiment which is not shown, a mixer may be provided to combine signals from computing unit 10-1 and received signals from antenna 10-3 before they are supplied to the computing unit 10-2.

Alternatively, antenna 10-3 may be connected solely to computing unit 10-1, wherein vehicle-to-X messages received from antenna 10-3 may be transmitted to computing unit 10-1 and combined, for example digitally, with the simulated information in the computing unit 10-1. Said information may then be transmitted at the analog or digital level by computing unit 10-1 to computing unit 10-2. To this end, a circulator may be used at the analog level between antenna 10-3, computing unit 10-1 and computing unit 10-2, in order to prevent the units from interfering with one another.

Figure 2:
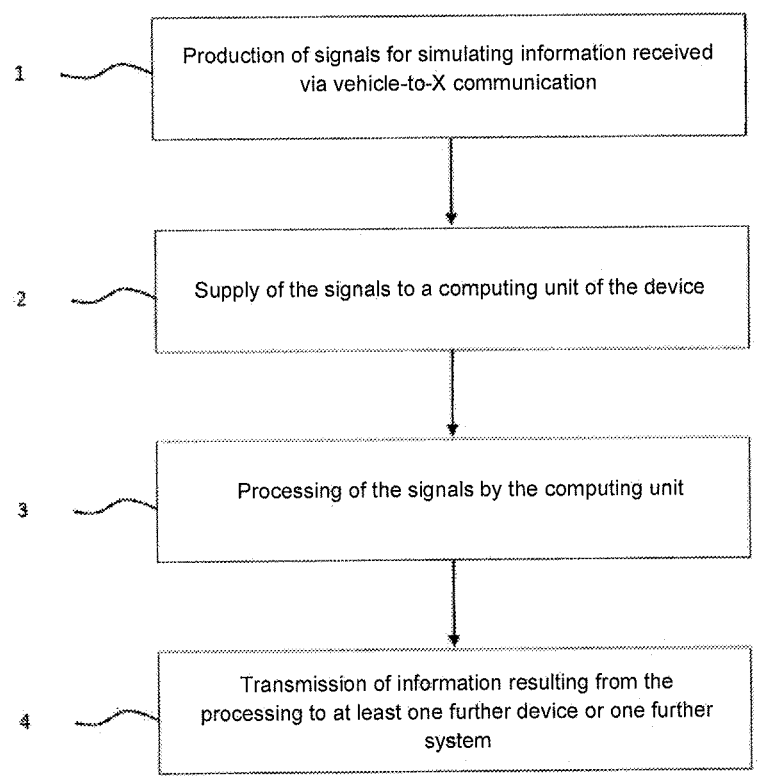

FIG. 2 shows an exemplary embodiment of the method according to an aspect of the invention with the assistance of a flow diagram. In a step 1, signals are produced for simulating information received via vehicle-to-X communication by a device for vehicle-to-X communication. These signals are supplied in a step 2 to a computing unit of the device which in a step 3 performs processing of the signals. Then in a step 4 information resulting from the processing is transmitted to at least one further device or one further system for example of a vehicle.

In the event that, over the course of the procedure, a feature or a group of features is not absolutely necessary, then the applicant already requests a wording of at least one independent claim in which the feature or group of features is no longer included. This may for example be a sub-combination of a claim present at the filing date or a sub-combination limited by further features of a claim present at the filing date. Such claims or combinations of features which are to be reworded should be understood to also be covered by the disclosure of this application.

It should also be pointed out that configurations, features and variants of aspects of the invention, which are described in the various embodiments or exemplary embodiments and/or shown in the figures, may be combined with one another as desired. Individual or multiple features are interchangeable as desired. Resultant combinations of features should be understood also to be covered by the disclosure of this application.

Back-references in dependent claims should not be understood to amount to renouncing independent objective protection for the features of the back-referenced subclaims. These features may also be combined as desired with other features.

Features which are only disclosed in the description or features which are disclosed in the description or in a claim only in conjunction with other features may in principle independently have significance which is essential to aspects of the invention. They may therefore also be included individually in claims for the purpose of differentiation from the prior art.

In general, it should be noted that vehicle-to-X communication is in particular taken to mean direct communication between vehicles and/or between vehicles and infrastructure units. For example, it may thus be vehicle-to-vehicle communication, vehicle-to-infrastructure or vehicle-to-person communication. If, in the context of this application, reference is made to communication between vehicles, this may in principle proceed for example in the context of vehicle-to-vehicle communication, which typically proceeds without mediation by a mobile radio network or a similar external infrastructure and which may therefore be distinguished from other solutions which are based for example on a mobile radio network. For example, vehicle-to-X communication may proceed on the basis of standards IEEE 802.11p or IEEE 1609.4. Vehicle-to-X communication may also be described as C2X communication or V2X communication. The sub-categories may be described as C2C (car-to-car) and V2V (vehicle-to-vehicle) or C2I (car-to-infrastructure) and V2I (vehicle-to-infrastructure). However, aspects of the invention explicitly do not rule out vehicle-to-X communication with mediation for example via a mobile radio network.

The invention claimed is:

1. A device for vehicle-to-X communication comprising:
   a computing unit including an output path for transmitting transmission information via vehicle-to-X communication and an input path for receiving reception information via vehicle-to-X communication,
   wherein the computing unit is configured to:
   1) selectively couple the output path to at least one antenna, and transmit the transmission information via the at least one antenna,
   2) selectively couple the input path to the at least one antenna, and receive the reception information via the at least one antenna, and
   3) selectively couple the input path to the output path, generate simulation signals for simulating the reception information, and supply the simulation signals from the output path to the input path for processing by the computing unit.

2. The device according to claim 1, wherein the information resulting from processing of the signals is transmissible at least in part to at least one other device for processing.

3. The device according to claim 1, wherein at least one of one road user, one infrastructure unit, or one central server is simulatable by the signals.

4. The device according to claim 1, wherein the information received via the vehicle-to-X communication from at least one of a road user, an infrastructure unit, or a central server is simulatable by the signals.

5. The device according to claim 1, wherein at least one processing stage of the received vehicle-to-X messages is simulatable by the signals.

6. The device according to claim 1, wherein information transmitted from at least one of a road user, an infrastructure unit, or a central server relating to at least one of a speed, position, route, acceleration, or an incident is simulatable by the signals.

7. The device according to claim 1, further comprising and antenna wherein the signals are functionally suppliable to the input path between the antenna and the computing unit.

8. The device according to claim 1, wherein the signals are radio frequency signals.

9. The device according to claim 1, wherein at least one part of an output path of the device, which is suitable for emitting information by vehicle-to-X communication, is usable for supplying the signals to the input path.

10. The device according to claim 1, wherein the device is designed to effect a comparison of results expected on the basis of the signals with results actually detected.

11. The device according to claim 1, wherein the simulated information is able to be formed as a function of an intrinsic motion of the device.

12. The device according to claim 1, wherein the simulated information is able to be formed as a function of information actually received via vehicle-to-X communication.

13. The device according to claim 1, wherein the simulated information is able to be formed as a function of a location-related and/or time-related setpoint.

14. The device according to claim 1, wherein the device is designed to modify information received by vehicle-to-X communication by a predeterminable location-related and/or time-related offset.

15. Use of the device according to claim 1 in a vehicle.

16. A method comprising:
   selectively coupling, by a computing unit, an output path of the computing unit for transmitting transmission information via vehicle-to-X communication to at least one antenna, and transmitting the transmission information via the at least one antenna;
   selectively coupling, by the computing unit, an input path of the computing unit for receiving reception information via vehicle-to-X communication to the at least one antenna, and receive the reception information via the at least one antenna; and
   selectively coupling, by the computing unit, the input path to the output path, generating simulation signals for simulating the reception information, and supplying the simulation signals from the output path to the input path for processing by the computing unit.

* * * * *